United States Patent [19]

Jerhammar

[11] 4,213,248
[45] Jul. 22, 1980

[54] NAVIGATIONAL AID DEVICE FOR DETERMINING DIRECTION IN A CHART

[76] Inventor: Lars-Olow Jerhammar, Kanalgatan 112, 603 65 Norrköping, Sweden

[21] Appl. No.: 10,679

[22] Filed: Feb. 9, 1979

[30] Foreign Application Priority Data

Feb. 9, 1978 [SE] Sweden .................................. 7801534

[51] Int. Cl.$^2$ .......................... B43L 5/00; B43L 13/04
[52] U.S. Cl. ........................................ 33/431; 33/443
[58] Field of Search ..................... 33/1 SB, 1 SD, 430, 33/431, 435, 443

[56] References Cited

U.S. PATENT DOCUMENTS

| | | | |
|---|---|---|---|
| 2,110,087 | 3/1938 | Kuhn | 33/435 |
| 3,345,751 | 10/1967 | Banzee et al. | 33/435 |
| 3,393,458 | 7/1968 | Freda | 33/431 |
| 3,456,352 | 7/1969 | Bowen | 33/431 |

*Primary Examiner*—Charles E. Phillips
*Attorney, Agent, or Firm*—J. Harold Nissen

[57] ABSTRACT

A navigational aid to define the direction relative to a reference direction of a line between two designated points on a chart of the kind comprising a base surface for the chart, a rotatable direction indicating member having one or more directional indices and being displaceable relative to the base surface carried by two mutually cooperating support means of which a first one is movable relative to the base surface in one direction along a stationary rectilinear guide means, and the second one is movable in a direction perpendicular thereto along a rectilinear guide means carried by the first support means. In a device according to the invention said first movable support means constitutes a first rectangular transparent frame, carried in guide means located at each one of two opposite edges of the frame by each one guide rail which is stationary relative to the base surface and along which this first frame is movable in said one direction. On each one of its two mutually opposite edges extending perpendicularly to the stationary guide rails, this first frame comprises guide means for slidably carrying the second support means, as well forming a transparent frame, at two opposite and mutually parallel edges thereof having guide means cooperating with the last mentioned guide means of the first frame. The direction indicating member is journalled in the second frame with its axis of rotation substantially half-way between the guide means at said edges of the second frame.

6 Claims, 5 Drawing Figures

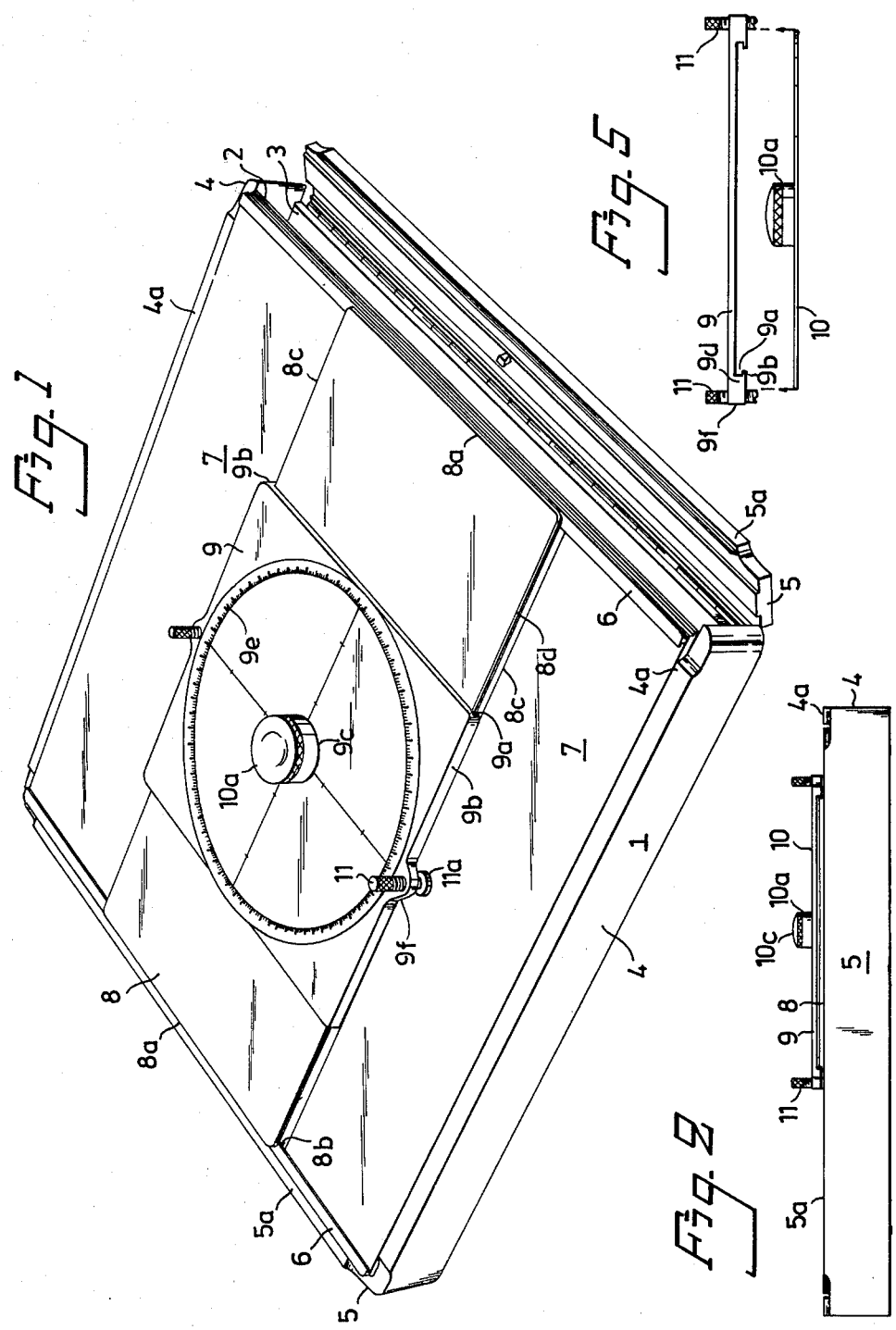

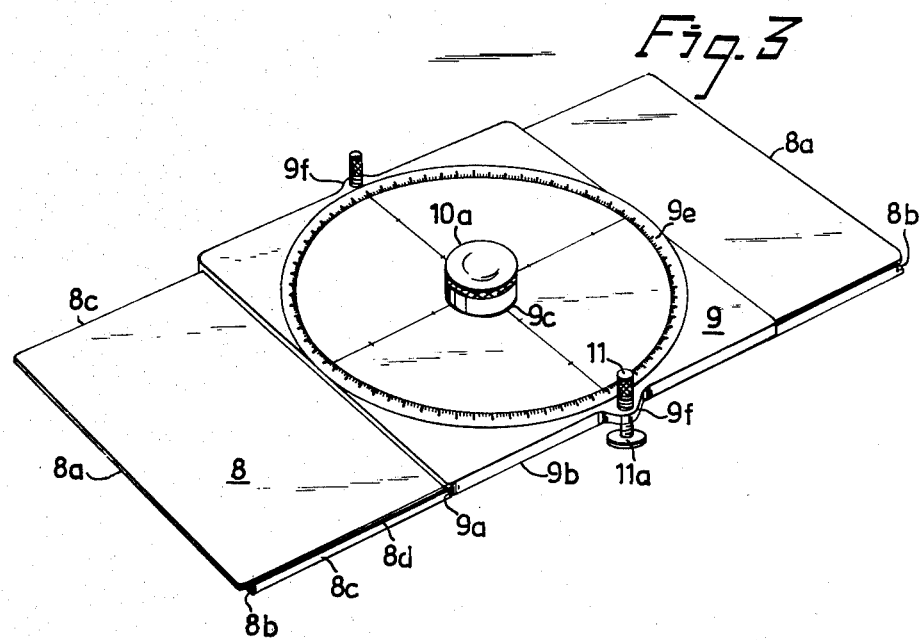
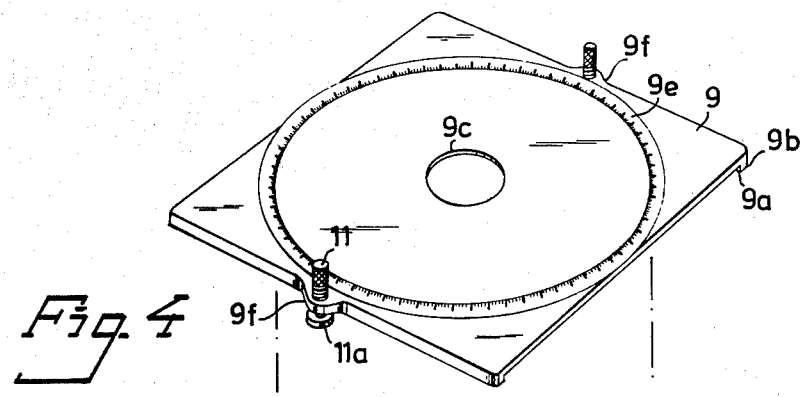
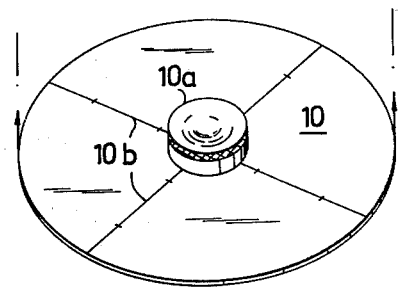

NAVIGATIONAL AID DEVICE FOR DETERMINING DIRECTION IN A CHART

Devices to facilitate determination of the direction from one point to an other on the surface of the earth guided by charts are known in a plurality of different constructions, more or less adapted to the purpose they are intended to serve in the specific case.

The present invention deals with a device of this kind which is particularly suited as navigational aid to determine direction of a connection line between two points on the earth by guide of a chart in true angle chart projection, more specifically the Mercator projection.

The invention relates to a device of this kind, which, for determining direction by guide of a chart, comprises a support surface for the chart, a marine chart for instance, and a direction indicating index carrying means which is rotatable in a bearing relative to the support and displaceable over the support in a direction along and carried by a rectilinear guide, said guide in its turn being displaceable in a direction perpendicular thereto along a second guide. Prior devices of this kind usually comprise a rotatable, direction indicating index carrying means which is carried by a translucent plate having a protractor against which the index of the rotatable means is read to find a direction, said plate at one edge thereof being carried by a sleeve which is displaceable along a bar, which in its turn by means of a sleeve is carried by and displaceable along a second bar, arranged perpendicular to the first bar. A device of this kind is described, for instance, in the U.S. Pat. No. 3,393,458. By displacing the first mentioned bar along the second one and the plate along the first bar, the center of rotation of the rotatable index means may be placed over one of the points between which the direction relative to a reference direction is to be determined, whereafter an index of the rotatable means is set to determine the direction to the second point.

Devices of this kind must, to retain a desired accuracy after long use, have a rather heavy construction and do, further, generally show the disadvantage that the support means for the rotatable index means to allow displacement of said means over a specific rectangular surface, have to be located outside of two sides of said surface, there occupying a considerable space, wherefore the support surface for the chart to carry the bars constituting the guides for the rotatable index means has to be considerably much greater than the surface over which a direction determination can be executed.

An object of the invention is to provide a device of this kind in which, with comparatively simple constructural means, a sturdy and in long use reliable guidance of the displacement of the rotatable, direction indicating index means in the two mutually perpendicular directions is made possible.

A further object of the invention is to provide a device making possible that the support surface for a chart of a specific maximum standard size can be given substantially the same dimensions as the chart as seen in the direction perpendicular to the plane of the chart.

To this end a navigational aid device according to the invention shows characteristic features stated in the accompanying claims. Thus, according to the invention, a navigational aid device of the kind described above for determining the angle of direction relative to a reference direction from one point to another in a chart and comprising a support for the chart, a rotatable index means which is provided with one or more direction indicating indices and is displaceable relative to the support, carried by two co-operating support means, of which a first one is displaceable relative to the support in one direction, guided by a rectilinear guide, and the second is displaceable in a direction perpendicular thereto relative to said first support means, as well guided by a rectilinear guide, the device according to this invention being characterized by said first support means constituting a first rectangular, transparent frame, which at each one of two opposite edges is carried by a guide means which is stationary relative to the support, and displaceable along said guide means, said first rectangular frame at its two edges extending perpendicular to said stationary guide means having guide means for carrying said second support means, said second support means constituting a second transparent frame having at each one of two mutually opposite edges guide means co-operating with said last mentioned guide means of said first frame for displacement of said second frame along said first frame, the rotational axis of said direction indicating index means being rotatable in a bearing in the second frame, the axis of rotation being located substantially half-way between the edges of said second frame which are in engagement with guide means of said first frame.

In a preferred embodiment of the invention, said first frame consists of a rectangular, transparent plate, which at two mutually opposite edges has guide means co-operating with the stationary guide means and at the other two mutually opposite edges has guide means co-operating with guide means of the second frame.

Further, in a preferred embodiment of the invention the second frame consists of a transparent, substantially quadratic plate having guide means at two mutually opposite edges and carrying the index means with its rotational axis at the center of the quadratic plate.

Due to the fact that all parts of the device are transparent, a device according to the invention allows a substantially complete view of all parts of an underlying chart in all positions of components of the device, the cart only being interfered with by present indices and protractor, as well as possibly desired means for securing the displaceable parts of the device in a selected position relative to the support.

The invention will now be more closely explained with reference to the accompanying drawings, in which FIG. 1 shows a general assembly of an embodiment of a navigation case or desk which, as an example, may be dimensioned for marine charts of specific size which, when placed on the top surface of the desk, obtains an orientation in the north-south-direction determined by boarders, FIG. 2 shows the desk of FIG. 1 as seen from one side thereof, in a somewhat smaller scale, FIG. 3 shows a rectangular and transparent first frame which is displaceable in one direction along stationary guide means and which at its edges perpendicular to said guides is provided with guide means for a rectangular, preferably quadratic, transparent second frame which is displaceable over the first frame, guided by the guide means of the first frame, as well as a circular index disc which is rotatably journalled in an aperture located centrally of the second frame, FIG. 4 is an exploded view of the second frame and the index disc, and FIG. 5 an exploded view of the second frame and the index disc as seen from the side in the direction, in which the second frame is displaceable relative to the first frame.

In the shown embodiment the support surface for a chart, a marine chart for instance, by guidance of which direction between two points, such as courses and bearings is to be determined by aid of the device, constitutes a case 1 having a top 2, a bottom 3, two mutually parallel sidewalls 4 and two mutually parallel sidewalls 5 extending perpendicularly to the sidewalls 4. One of the sidewalls 5 constitutes a lid for a space within the case for keeping charts not used for the moment. A guide rail 6 extends parallel to and adjacent each one of the sidewalls 5 substantially along all the length of the sidewall. In the illustrated embodiment the guide rails 6 are fastened to a transparent, stationary frame 7 formed by a transparent plate, the dimensions of which are such that it fits in between rims 4a and 5a, respectively, of the sidewalls extending beyond the surface of the top 2. When using the device, a chart is angle-true placed on the case top 2 underneath the transparent plate 7, that is, in practice, preferably with meridians perpendicular to the guide rails 6.

A first displaceable rectangular frame 8 in form of a transparent plate having a length substantially corresponding to the distance between the two guide rails 6 and a width conveniently about half the length, has at its two mutually opposite shorter edges 8a slots 8b, each enclosing a respective guide rail 6, the guide means 8b and 6 together guiding the plate to obtain an accurately translatory motion when displaced along the guide rails 6.

On top of this first transparent frame 8, which is thus movable along the guide rails 6, a second transparent frame 9 is arranged displaceable in a direction perpendicular to the longitudinal direction of the guide rails 6, that is, perpendicular to the direction in which the first displaceable frame 8 is movable along said guide rails. As shown, this second displaceable frame 9 is as well formed by a transparent plate. For holding this second frame 9 attached to the first frame 8 and guiding the second frame 9 when moved along the first frame, the first displaceable frame 8 has at its edges 8c boarder edgings 8d, extending all along the edges 8c, said edgings co-operating with slots 9a in portions of edges 9b extending downwardly of the edges 8c of frame 8.

As more closely shown in FIGS. 4 and 5, a circular index disc 10 is journalled in an aperture 9c, located substantially mid-way between the edges 9b of the second frame 9, the index disc 10 having a transparent pivot 10a, as well adapted to be used for manipulating the index disc. To hold together the components of the device as a unit, the index disc 10 is located within a recess 9d at the bottom side of frame 9, the pivot 10a extending through the aperture 9c of the second frame 9 to be accessible for rotating the index disc. As shown, the index disc 10 has a circular shape and carries index lines 10b which at choice may be used for determining directions by reading at a protractor 9e on the second frame 9.

As appearing from FIG. 2 the transparent pivot 10a is as shown in the illustrated embodiment made in form of a lens to facilitate accurate positioning of the disc center over a designated point in a chart.

To make possible a positioning of the center of rotation of the disc 10 to each point of a chart covering the entire top surface of the case between the sidewalls 4 and 5, the top edges 4a of the sidewalls 4 are located at a level such that the first frame 8 is movable beyond the edges 4a, the guidance of the frame 8 being still satisfactory by engagement of corresponding guide means over half the width of the frame 8. In a similar manner the top edges 5a of the sidewalls 5 are at a level such that the second frame 9 may, with retained satisfactory guidance, be moved so far beyond the sidewalls 5, that the center of rotation of the index disc can be moved up to the guide rails 6, the device thus allowing for determining directions in the chart over its entire surface from any part of the chart.

As shown, the second frame 9 has two protruding notches 9f, carrying clamping means for holding the two frames against displacement in co-operation with the stationary plate 7 in a desired position. Said clamping means are shown as screws 11 with pads 11a co-operating with the underlying plate.

A navigational charting device according to the invention constitutes a versatile, accurate and conspicious navigational aid, specifically adapted for navigation in archipelagos and fringes of skerries, near and off the coast, due to the speed and security with which courses and bearings can be established therewith.

Preferred mutual dimensions of the different components of the device, originating from a chart support surface corresponding to a desired standard chart size, is a width of the first displaceable rectangular frame (the transparent plate 8) is substantially half of the dimension of the support surface in the direction, in which the frame 8 is displaceable, the second displaceable frame (the transparent plate 9) being substantially quadratic and having an edge length corresponding to the width of frame 8, the diameter of the index disc 10 having a length close to the length of frame 9 to make possible a length of index lines which are as long as possible with respect to the dimensions of frame 9.

I claim:

1. A device to define the direction relative to a reference direction from one point to a second one on a chart, comprising a base having a base surface for the chart, a member having a direction indicating index and being rotatable and displaceable relative to the base surface, said member being carried by two mutually co-operating support means of which a first one is displaceable relative to the base surface in one direction along a stationary rectilinear guide means located on said base adjacent said base surface, and the second one is displaceable in a direction perpendicular thereto along a rectilinear guide means carried by said first support means, characterized by said first displaceable support means constituting a first rectangular transparent frame (8), said first frame at each one of two mutually opposite edges (8a) having guide means respectively co-operative with each one rectilinear guide means (6) which is stationary relative to the base surface and along which said first frame is displaceable in said first direction, said first support means on each one of its two mutually opposite edges (8c) extending perpendicularly to said stationary guide means comprising guide means (8d) for slidably carrying said second support means, said second support means as well forming a transparent frame (9) and having at two opposite and mutually parallel edges guide means (ab) co-operating with the last mentioned guide means (8d) of said first frame, the direction indicating member (10) being journalled in said second frame with its axis of rotation substantially half-way between said guide means of said second frame.

2. Device according to claim 1 in which said first rectangular transparent frame consists of a transparent plate, having at two mutually opposite edges guide means co-operative with said stationary guide means and at its two other mutually opposite edges guide means co-operative with said guide means at mutually opposite edges of said second frame.

3. Device according to claim 1, said second frame constituting a transparent, substantially quadratic plate.

4. Device according to claim 3, said direction indicating member being journalled in the plate constituting said second frame, having a portion carrying direction indicating member located between said first and said second frames and a pivot to manipulate the member protruding upwardly of said second frame.

5. Device according to claim 1, in which the width of said first displaceable rectangular frame is substantially half the dimension of the base surface in the direction in which said frame is displaceable, and said second displaceable frame is substantially quadratic and has an edge length corresponding to the width of said first frame.

6. Device according to claim 1, in which said stationary guide means are fastened at two mutually opposite edges of a transparent plate covering the base surface to protect a chart inserted between the base surface and said plate, the base surface having upwardly protruding boarders to prevent lateral motion of said plate relative to the base surface, of which boarders the ones extending perpendicular to said stationary guide means being at a level below the lowermost portions of said first frame and the boarders parallel to the stationary guide means being at a level lower than the lowermost portions of said second frame.

* * * * *

UNITED STATES PATENT AND TRADEMARK OFFICE
CERTIFICATE OF CORRECTION

PATENT NO. : 4,213,248
DATED : July 22, 1980
INVENTOR(S) : Lars-Olow Jerhammar

It is certified that error appears in the above—identified patent and that said Letters Patent is hereby corrected as shown below:

Column 3, Line 67 after "each" add --one--

Column 4, Line 65 change "(ab)" to --(9b)--

Signed and Sealed this

Sixteenth Day of December 1980

[SEAL]

Attest:

SIDNEY A. DIAMOND

Attesting Officer

Commissioner of Patents and Trademarks